United States Patent [19]

Um

[11] Patent Number: 5,185,660

[45] Date of Patent: Feb. 9, 1993

[54] ACTUATED MIRROR OPTICAL INTENSITY MODULATION

[75] Inventor: Gregory Um, Torrance, Calif.

[73] Assignee: Aura Systems, Inc., El Segundo, Calif.

[21] Appl. No.: 483,932

[22] Filed: Feb. 22, 1990

Related U.S. Application Data

[63] Continuation-in-part of Ser. No. 448,748, Dec. 11, 1989, which is a continuation-in-part of Ser. No. 429,987, Nov. 1, 1989.

[51] Int. Cl.$^5$ .............................................. G02F 1/13
[52] U.S. Cl. ............................................ 358/60; 358/61
[58] Field of Search ..................................... 358/60-61; 350/173, 331 R, 400-403, 408; 353/30-31, 34

[56] References Cited

U.S. PATENT DOCUMENTS

| | | | |
|---|---|---|---|
| 4,191,456 | 3/1980 | Hong et al. | 358/61 |
| 4,425,028 | 1/1984 | Gagnon et al. | 358/61 |
| 4,464,018 | 8/1984 | Gagnon | 358/61 |
| 4,500,172 | 2/1985 | Gagnon et al. | 353/31 |
| 4,592,628 | 6/1986 | Altman et al. | 358/60 |
| 4,687,301 | 8/1987 | Ledebuhr | 358/61 |
| 4,755,869 | 7/1988 | Tanaka | 358/60 |
| 4,826,311 | 2/1989 | Ledebuhr | 353/31 |
| 4,864,390 | 9/1989 | McKechnie et al. | 353/34 |
| 4,969,730 | 11/1990 | van den Brandt | 353/30 |

*Primary Examiner*—Stephen Brinich
*Attorney, Agent, or Firm*—Anthony T. Cascio

[57] ABSTRACT

A television display apparatus wherein a white light source emits 9a beam onto a plurality of dichroic mirrors which split the beam into three beams of the primary colors, then reflects the three primary beams onto three deformable reflective surfaces, which again reflect the beams through slits in a non-reflective surface, thereby modulating the intensity of the beams. The amount of light passing through the slits is horizontally scanned by one surface of a rotating polygonal mirror, then passes through collimating and projection lenses and onto a screen.

40 Claims, 5 Drawing Sheets

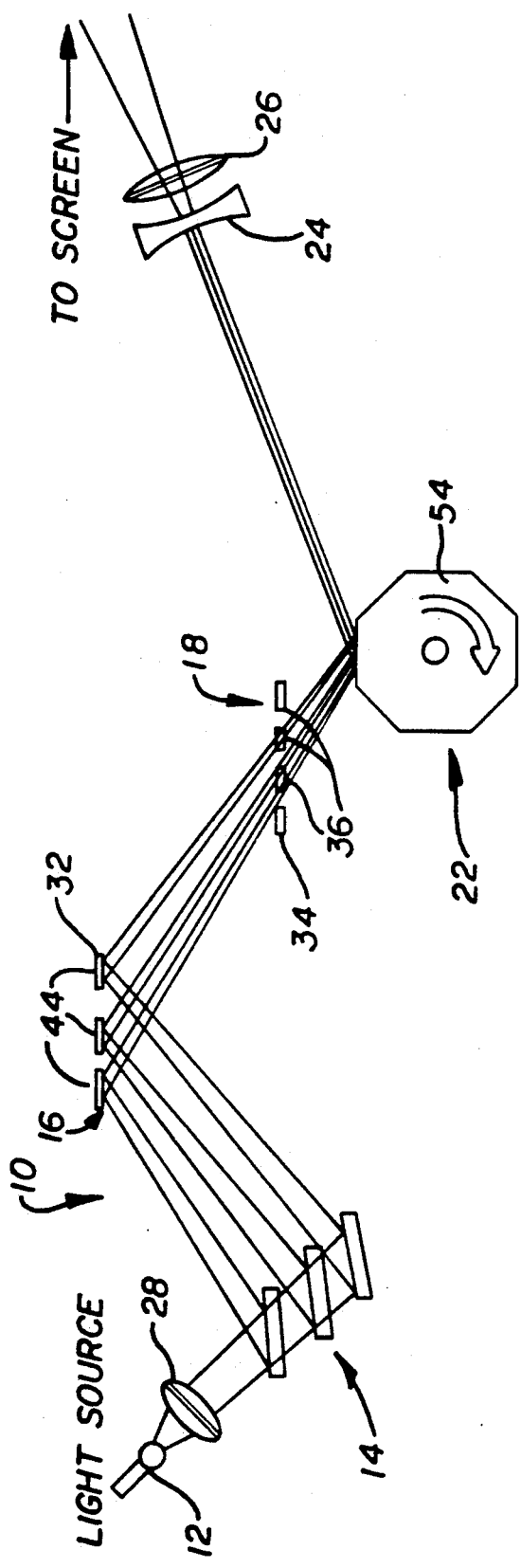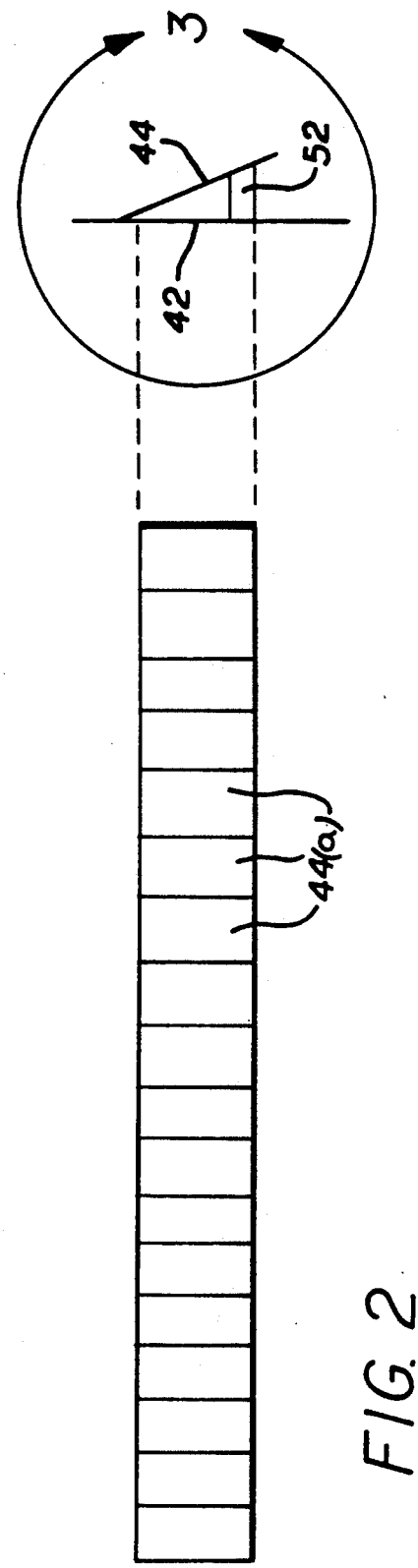
FIG. 1
FIG. 2

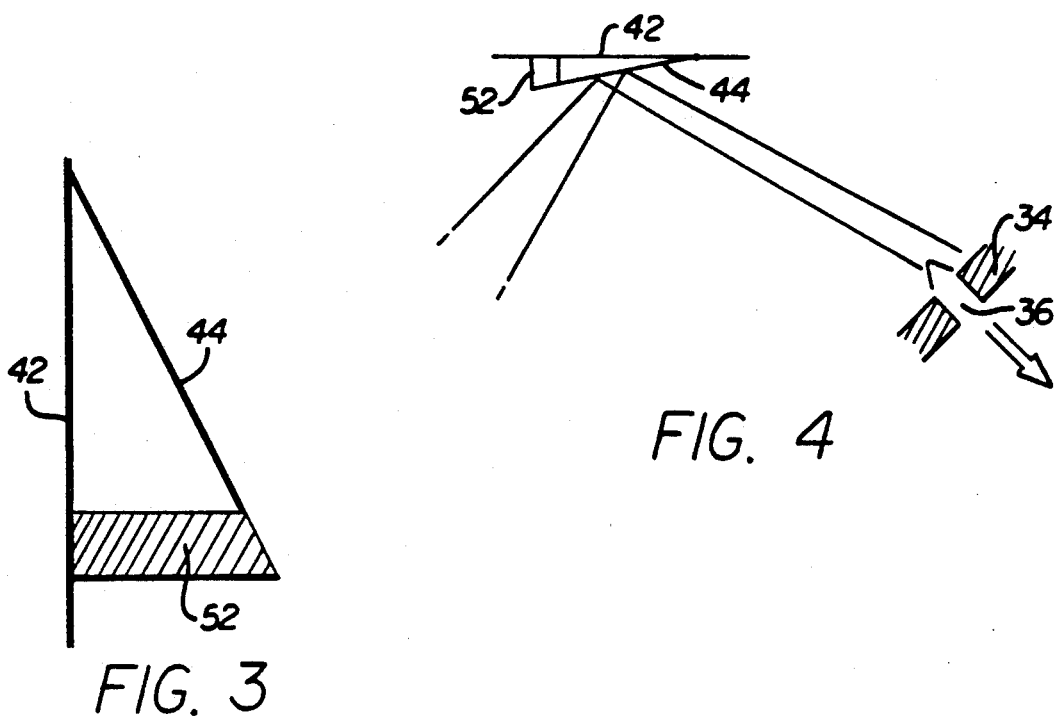
FIG. 3
FIG. 4
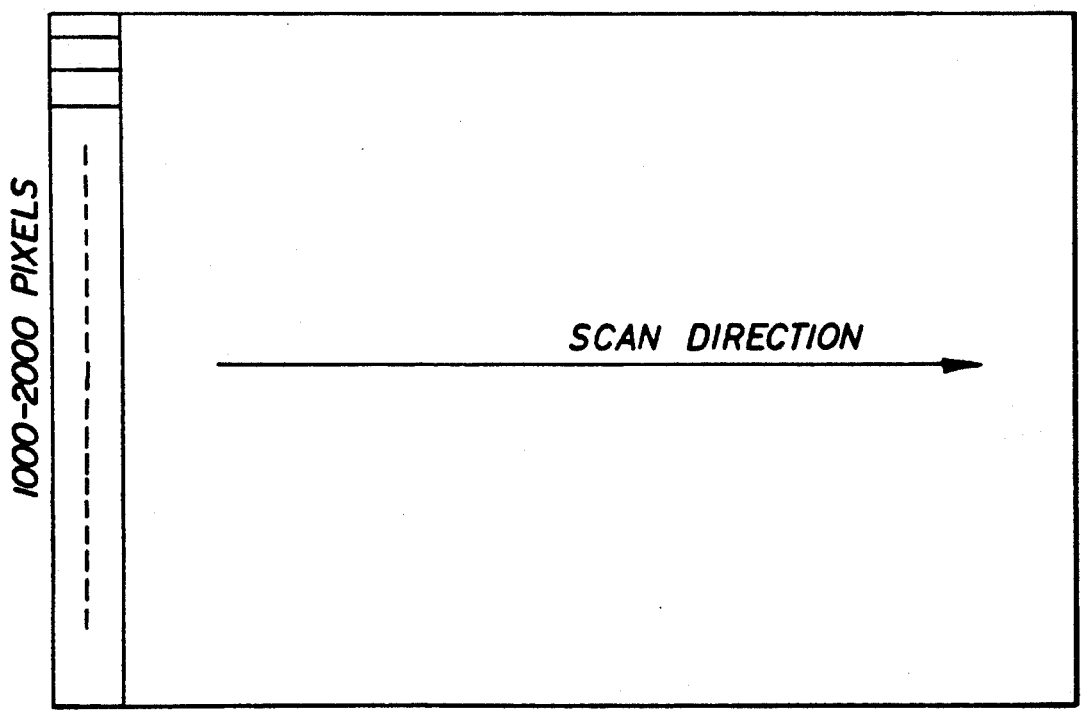
FIG. 5

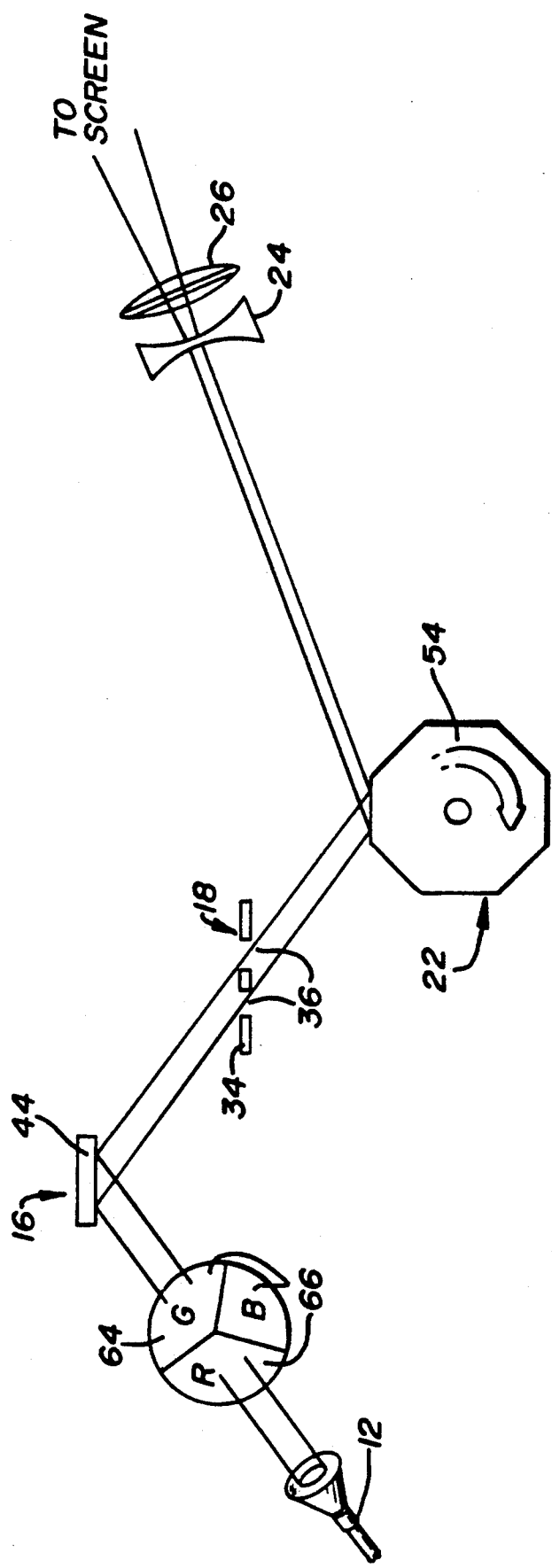

ACTUATED MIRROR OPTICAL INTENSITY MODULATION

RELATED APPLICATION DATA

The present application is a continuation-in-part of U.S. Ser. No. 07/448,748 filed Dec. 11, 1989, which is a continuation-in-part of U.S. Ser. No. 07/429,987 filed on Nov. 1, 1989.

FIELD OF INVENTION

The present invention generally relates to a unique television display apparatus and, more specifically, to a television display apparatus which reflects light beams from a mirror array and through slits in a non-reflective surface in order to modulate the intensity of the projected beams.

BACKGROUND OF THE INVENTION

It is well known in the prior art to produce a television display by modulating beams of light in accordance with electrical signals received from a control system. The modulated beams of light are then converted into images by an optical scanning mechanism.

In order to create a color display, three beams of light must be modulated, one in each of the primary colors, red, green and blue. It is also well known in the art to split a white light beam into three primary colored beams. For example, in Stavis, U.S. Pat. No. 3,507,984, an argon laser beam is passed through a prism in order to split the beam into blue and green beams. In Biedermann, U.S. Pat. No. 3,510,571, a light source is split into three primary colored beams by passing the beam through interference mirrors and filters.

The beams of light are then typically modulated by conventional light modulators such as acousto-optic modulators. This invention discloses an optical modulation television which will not require these conventional modulators.

It is also known in the art to use rotating reflective surfaces in order to provide horizontal sweep. In Biedermann, the optical system for horizontal scan includes a rotating polygonal prism. In Roth, U.S. Pat. No. 3,760,096, the optical system for horizontal sweep includes a rotating pyramidal mirror.

SUMMARY OF THE INVENTION

This invention relates to a television display apparatus, and more particularly to a television display apparatus comprising a white light source having a collimation lens; means for splitting said white light into three primary light beams; means for spreading said primary light beams; a non-reflective surface having apertures therein; means for horizontally sweeping the light beams onto the screen; a second collimation lens; and a projection lens. Accordingly, it is the object of this invention to provide a unique optical modulation television which replaces a conventional light modulator with the combination of a mirror array and a non-reflective surface with apertures therein.

In another aspect of the present invention, the mirror array is a two dimensional array which allows substantially simultaneous projection of one frame of pixels. The two dimensional array allows the elimination of the horizontally sweeping means.

The foregoing and other objects, features and advantages of this invention will be apparent from the following, detailed, description of the preferred embodiments of this invention, as illustrated in the accompanying drawings.

BRIEF DESCRIPTION OF THE DRAWINGS

FIG. 1 is a diagrammatic view of the unique modulation television.

FIG. 2 is a top and a side view of one reflective surface of the mirror array.

FIG. 3 is an enlarged side view of one reflective surface of the mirror array.

FIG. 4 is diagrammatic side view of the light beam, tilt mirror array and non-reflective surface with apertures.

FIG. 5 is a graph of horizontal scan direction of the pixels.

FIG. 15 illustrates an alternative embodiment for developing the primary colors.

DESCRIPTION OF THE PREFERRED EMBODIMENT

Figure 6:
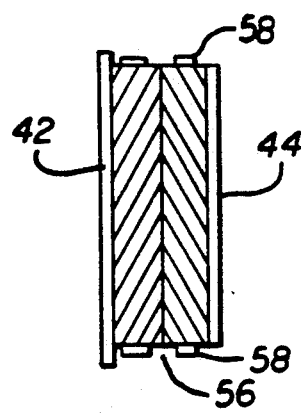
FIG. 6 is an enlarged side view of one reflective surface mounted on a bimorphic piezoelectric crystal layer.

Referring now to the accompanying drawings which set forth the present invention in greater detail and in which like numerals designate like features, FIG. 1 shows a unique modulation television 10 which comprises a white light source 12, means 14 for splitting said white light into three primary beams, means 16 for spreading each of said primary beams into a bell-shaped beam, means 18 for clipping said bell-shaped beams, horizontal scanning means 22, a second collimation lens 24, and a projection lens 26. In operation, the light source 12 emits a high intensity white light which passes through a first collimation lens 28 to form a collimated light beam. The collimated light beam illuminates the splitting means 14 which breaks the white light into three primary light beams, each being one of the primary colors; red, green and blue. In the preferred embodiment, the splitting means is a plurality of dichroic mirrors 20. However, in alternative embodiments, either a diffraction grating or a prism could be used to split the collimated white light beam into three primary light beams. In another embodiment, the white light source 12, the first collimating lens 28, and the splitting means 14 could be replaced by three coherent lasers, each being one of the primary colors.

In order to modulate the beams to their desired intensity, the spreading means 16 and clipping means 18 are used in combination. In the preferred embodiment, the spreading means 16 is comprised of a mirror array 32 and the clipping means 18 is comprised of a non-reflective surface 34 with a plurality of apertures 36 therein. The mirror array 32 in the preferred embodiment is comprised of three reflective surfaces 44, one reflective surface 44 corresponding to each primary light beam. The plurality of apertures 36 may either be a plurality of pinholes or a plurality of knife-edged slits.

As best shown in FIG. 3, a base member 42 is used to support the reflective surface 44 of the mirror array 32. The base member 42 is preferably constructed of a ceramic or silicone substrate. The mirror array 32 is comprised of three reflective surfaces 44, with one reflective surface 44 corresponding to each primary light beam. For each reflective surface 44, a piezoelectric crystal 52 is layered onto the base member 42. The reflective surface 44 is then layered on top of the piezoelectric crystal 52 and the base member 42.

Referring now to FIG. 2, the reflection surface 44 is shown. The layered base member 42, piezoelectric crystal 52, and reflective surface 44 are divided into segments to form a plurality of disjointed reflective surfaces 44(a) reflects a beam which forms one pixel in each column of the image. Each of the disjointed reflective surfaces 44(a) reflects a beam which forms one pixel in each column of the image.

Referring again to FIG. 3, the reflective surface 44 is shown attached at one end to the base member 42 and at the opposite end to the piezoelectric crystal 52. Alternatively, the reflective surface 44 may be attached at both ends to separate piezoelectric crystals 57, with one crystal 52 at each respective opposite end of the reflective surface 44.

When a voltage is applied to the piezoelectric crystal 52, the crystal 52 deforms causing the reflective surface 44 to tilt. The tilting of the reflective surface 44 causes the reflected beam to become misaligned with respect to the aperture 36 through which it passes, thereby lowering its intensity. In this embodiment, the piezoelectric crystal 52 deforms vertically when voltage is applied. As an alternative, a constant frequency, varying voltage can be applied to the crystal 52 which causes the crystal 52 and, in turn, the reflective surface 44 to vibrate vertically with a controllable amplitude. The vibration of the reflective surface 44 causes the reflected beams to fan out thereby reducing the amount of the optical energy passing through the appropriate aperture 36.

The reflective surface 44, the piezoelectric crystal 52 and the base member 42 may be constructed in several alternative embodiments. These alternative embodiments are shown in FIGS. 6 through 12. A particular embodiment may be preferred according to the amount of light spreading and the degree of control necessary for a particular application.

Referring now to FIG. 6, an alternative embodiment is shown with the reflective surface 44 mounted upon a bimorphic piezoelectric crystal layer 56. For this embodiment, the piezoelectric crystal layers 56 deform horizontally when voltage is applied. Each layer has an electrode 58 on one end. A different voltage is applied across each crystal layer 56, causing one layer to expand horizontally while another layer contracts horizontally. As a result, the reflective surface 44 bends in a bowing manner. The control voltage is applied to the piezoelectric material 52 or crystal layer 56 similar to conventional video display technology by electronic control circuitry similar to that used when generating pixel voltages from a bit mapped memory.

Figure 7:
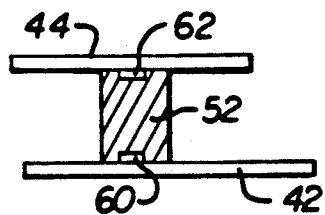
FIG. 7 is an enlarged side view of one reflective surface mounted on a small piezoelectric crystal pedestal.

As shown in FIG. 7, an alternative embodiment of the mirror array 32 shows each reflective surface 44 being layered on top of and attached to the piezoelectric crystal 52. In this embodiment, the reflective surface 44 needs to be very flexible. The piezoelectric crystal 52 forms a pedestal upon which the reflective surface 44 is supported. The piezoelectric crystal 52 is further layered on top of and attached to the base member 42. One of a plurality of metal contacts 60 is mounted between the piezoelectric crystal 52 and the reflective surface 44. Another one of the electrodes or metal contacts 60 is mounted between the piezoelectric crystal 52 and the base member 42. The reflective surface 44 is not attached directly to the base member 42. The piezoelectric crystal 52 deforms vertically when a voltage is applied. Therefore, when a variable voltage is applied to the piezoelectric crystal 52 with a frequency near a flexural resonance of the mirror, the crystal 52 and, in turn, the reflective surface 44 deforms and flexes in a vertical direction causing the reflected beam to fan out or scatter.

Figure 8:
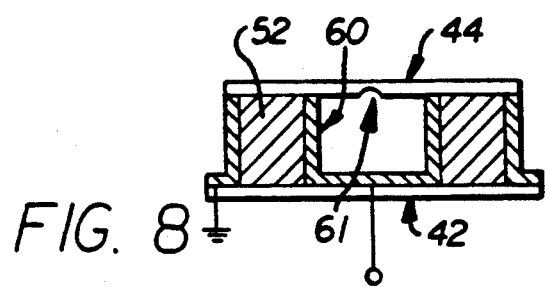
FIG. 8 is an enlarged perspective view of one flexible reflective surface mounted on two piezoelectric crystal pedestals.

Another embodiment of the invention is shown in FIG. 8. In this embodiment, the reflective surface 44 is mounted on two piezoelectric crystals 52 which operate in a shearing mode. In this embodiment, the reflective surface needs to be very rigid. The piezoelectric crystals deform horizontally when a voltage is applied to the electrodes 60 mounted on the sides of the crystals 52. The crystals 52 are mounted on the base member 42. The crystals 52 are each mounted on opposite ends of the reflective surface 44, which leaves the center of the reflective surface 44 unsupported. When voltage is applied to the piezoelectric crystals 52, the crystals 52 deform horizontally which results in a bending motion in the reflective surface 44. Typically grooves 61 are cut at the reflective surface 44 to facilitate triangular bending.

Figure 9:
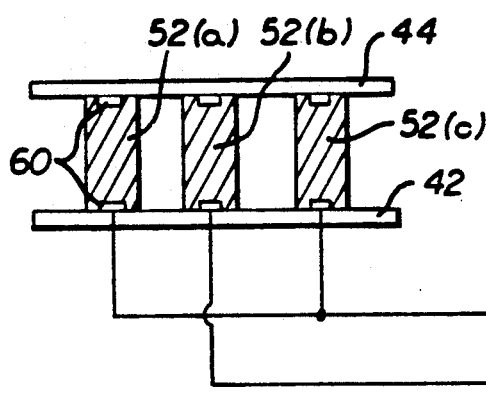
FIG. 9 is an enlarged side view of one reflective surface mounted on three piezoelectric crystals.

Another embodiment of the invention is shown in FIG. 9. In this embodiment, each of the reflective surfaces 44 is layered on top of three piezoelectric crystals 52; a first piezoelectric electric crystals 52(a), a second piezoelectric crystal 53(b), and a third piezoelectric crystal 53(c). The piezoelectric crystals 53(a), 53(b) and 53(c) are formed in the shape of a pedestal to support the reflective surface 44. A ground wire 62 is run across the top of the reflective surfaces 44 to provide grounding. Each of the piezoelectric crystals 53(a), 53(b) or 53(c) expands and contracts vertically when a voltage is applied to the crystals 53(a), 53(b) or 53(c). The piezoelectric crystals 53(a), 53(b) and 53(c) are mounted upon the base member 42. The voltages applied to the first 53(a) and third 53(c) piezoelectric crystals are in phase with each other. However, the voltage applied to the second piezoelectric crystal 53(b) is 180 degrees out of phase with the voltage applied to the first 53(a) and second 53(c) piezoelectric crystals. Therefore, when voltage is applied to the piezoelectric crystal 53(a), (b), and (c), the reflective surface 44 bends upward and then downward in a triangular-shaped configuration.

Figure 10:
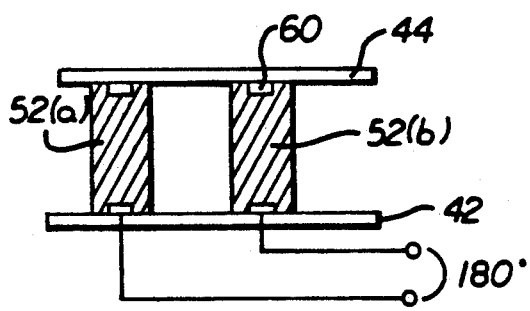
FIG. 10 is an enlarged side view of one rigid reflective surface mounted on two piezoelectric crystals.

Another alternative embodiment of the mirror array 32 is shown in FIG. 10. In this embodiment, each of the reflective surfaces 44 is layered on top of and attached to a plurality of piezoelectric crystals 52. The piezoelectric crystals 52 form a pedestal upon which the reflective surfaces 44 are supported. Preferably, two piezoelectric crystals 52 are used; a primary piezoelectric crystal 52(a), and a secondary piezoelectric crystal 52(b). Each of the plurality of piezoelectric crystals 52 is further layered on top of and attached to the base member 42. The reflective surface 44 is not directly attached to the base member 42. The piezoelectric crystals 52(a) and (b) deform vertically when a voltage is applied. However, the voltage applied to the primary piezoelectric crystal 52(a) is 180 degrees out of phase with the secondary piezoelectric crystal 52(b). As a result, the reflective surface 44 in this embodiment being relatively rigid, tilts as voltage is applied to the crystals 52.

Figure 11:
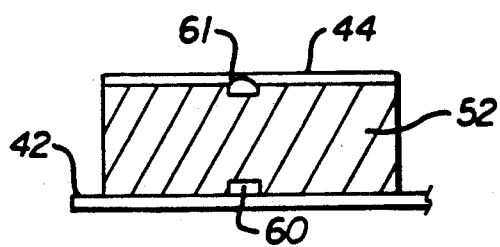
FIG. 11 is an enlarged side view of one reflective surface mounted on a single large piezoelectric crystal.

In FIG. 11, a variation of the previously described embodiment is shown. In this embodiment, the reflective surface 44 is layered on a single piezoelectric crystal 52. The piezoelectric 52 is of the same dimensions as the reflective surface 44. Therefore, the entire cross-section of the reflective surface 44 is supported by the crystal 52. The crystal 52 is securely attached to the reflective surface 44 at each end of the reflective surface 44. In turn, center of the bottom of the piezoelectric crystal 52 is attached to the base member 42. The piezoelectric crystal 52 deforms horizontally when voltage is applied to it. Therefore, when voltage is applied, the crystal 52 expands and contracts horizontally, causing the reflective surface 44 to bend in the center, where it is not securely attached to the crystal 52. The reflective surface 44 will flex into a triangular shape. Grooves 61 may be cut at the center of the reflective surfaces to facilitate bending.

Figure 12:
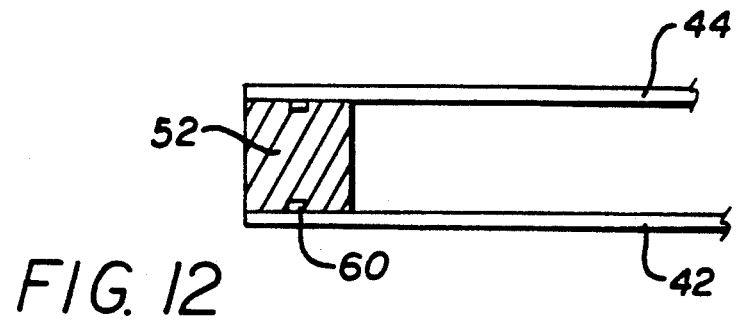
FIG. 12 is an enlarged side view of one reflective surface cantilevered on one piezoelectric crystal.

FIG. 12 shows another embodiment of the invention. The reflective surface 44 is mounted in a cantilever fashion on the single piezoelectric crystal 52. The crystal 52 is mounted on the base member 42. The piezoelectric crystal 52 expands and contracts vertically when a voltage is applied. Therefore, when an alternating of time varying voltage is applied, the flexible reflective surface 44 will vibrate up and down as the crystal 52 deforms.

Referring back to FIG. 1, each primary color beams illuminates a respective reflective surface 44 of the mirror array 32. Each reflective surface 44 is tilted, vibrated, or bent at an angle in accordance with the predetermined intensity of the respective pixel to be illuminated.

The beams reflected from the moving reflective surface 44 are spread into a bell-shaped beam. The flux and reflected angle of the bell-shaped beam is controlled for intensity modulation. To complete the intensity modulation, the bell-shaped beams are then reflected toward the clipping means 18, which in the preferred embodiment is the non-reflective surface 34. When a voltage is not applied to the piezoelectric crystals 52, the reflective surfaces 44 do not vibrate, tilt, or bend, and the beams reflected off of the mirror array 32 either do not spread or are aimed directly at the apertures 36 of the non-reflective surface 34. If the reflected beams are aimed directly at the apertures 36, a maximum amount of light from the reflected beams will pass through the apertures 36. However, when a voltage is applied to the piezoelectric crystals 52, the reflective surfaces 44 vibrate, tilt, or bend, depending on the embodiment used, and cause the beams reflecting off of the mirror array 32 to spread into bell-shaped beams. Therefore, only a restricted amount of light from the reflected beams pass through the plurality of apertures 36. The amount of light which passes through the plurality of apertures 36 determines the intensity of the respective pixels and colors. The apertures 36 can be pinholes or knife-edged slits.

The beams which pass through the plurality of apertures 36 of the non-reflective surface 34 then impinge upon the horizontal scanning means 22. In the preferred embodiment of the invention, the horizontal scanning means 22 is a polygonal rotating mirror 54. The beams reflect simultaneously off of one surface of the polygonal mirror 54 to provide a horizontal sweep of the column of pixels from each reflective surface 44 of the mirror arrays 32. The horizontal sweep of the column of pixels is shown in FIG. 5. In an alternative embodiment, the horizontal scanning means is a galvanometer mirror, also known in the art as a galvo mirror. In another embodiment, the horizontal scanning means 22 is a rotating holographic plate. The scanned beams are then passed through a second collimation lens 24 and a projection lens 26 in order to project an image upon the screen.

Figure 13:
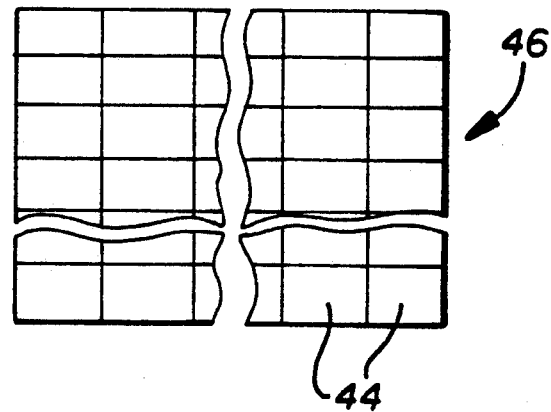
FIG. 13 illustrates a two-dimensional mirror array.

The above described embodiments (FIG. 3 and FIGS. 6-12) of the reflective elements 44 may be constructed in a two-dimensional MxN array 46, exemplarily illustrated in FIG. 13. The entire array 46 is illuminated and each reflective surface 44 is activated in accordance with a predetermined pixel intensity associated with such reflective surface 44. The reflected beams from each row (or from each column) of reflective surfaces 44 passes through an elongated aperture 36 to be modulated as hereinabove described. The light exiting each aperture 36 then displays one row (or one column) of the image on the screen. Accordingly, the horizontal scanning means 22 may be eliminated. An advantage of the two-dimensional array 46 is that an entire frame of pixels is simultaneously displayed without scanning.

Figure 14:
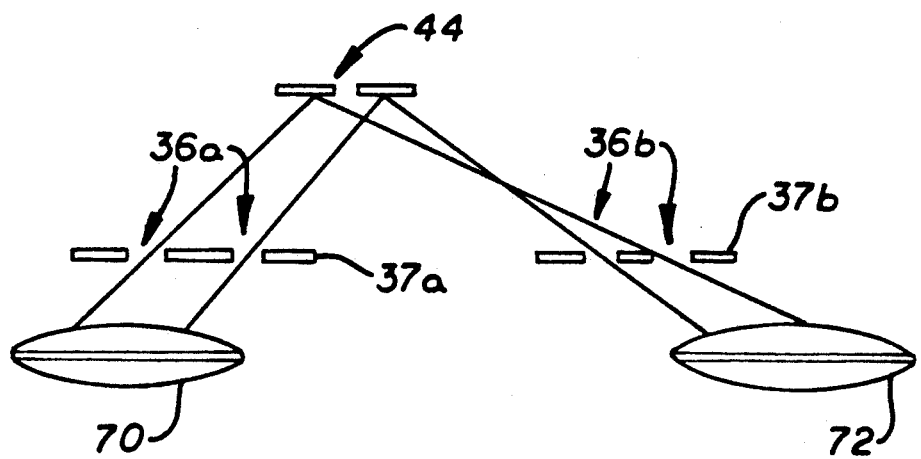
FIG. 14 is an alternative Schlieren embodiment of the unique modulation television shown in FIG. 1.

Referring now to FIG. 14, an alternative Schlieren optical projection system is described. The first slits 36a are disposed in the optical the path prior to the reflective surfaces 44 and the second slits 36b are disposed in the optical path subsequent to the reflective surfaces 44. The reflective surfaces 44 may be disposed in a linear array or two-dimensional array as hereinabove described. Placed to either side of the first slits 36a is a first lens 70, and placed to either side of the second slits 36b is a second lens 72. In absence of any control voltage activating the reflective surfaces 44, the lenses 70 and 72 image the first slits 36a to obfuscations 37b between the second slits 36b so that optical energy does not pass through. The second slits 36b are similarly imaged to obfuscations 37a between the first slits 36a. When the reflective surfaces are activated, as hereinabove described, the modulation of light is accomplished when a portion of the optical energy of a reflected beam, which is being shifted or spread, passes through the respective second slit 36b.

Referring now to FIG. 15, an alternative embodiment of the invention is shown. In this alternative embodiment, the splitting means 14 is replaced with a translucent rotating wheel 64. The rotating wheel 64 is equally divided into three segments 66. Each of the segments 66 is of one of the primary colors, red, green or blue.

When the white light emitted from the light source 12 passes through the rotating wheel 64, either a red, green or blue light beam is passed through the rotating wheel 64 and onto the spreading means 16. In comparison, the splitting means 14 of the previously described embodiment reflected three different colored beams simultaneously onto the spreading means 16. As a result, if the rotating wheel 64 is used, only one reflective surface 44 is required for the spreading means 16. In comparison, if the splitting means 14 is used, as in the previously described embodiment, three reflective surfaces 44 are required for the spreading means 16, one for each of the three light beams.

The rotating wheel 64 rotates at a rate of 60 rotations per second or as desired. Therefore, the wheel 64 rotates one time each 1/60 seconds. Because the wheel 64 is equally divided into three colors, a different color of light beam is emitted each 1/180 seconds. Thus, a red light beam is emitted onto the spreading means 16 for 1/180 second, then a blue light beam is emitted for 1/180 second, and finally a green light beam is emitted for 1/180 second. Although only one color of light beam at a time is emitted onto the spreading means 16, because of the rotational speed of the wheel 64, the eye will perceive the three consecutive color beams as being normal color. The above described rates of rotation are selected to be compatible with sixty frame per second composite video signals. Of course, the rotation rate may change for different video applications.

The color wheel 64 is particularly useful when using the two-dimensional mirror array 46. If a color display is desired, three arrays 46 would be needed should each array be illuminated by one of the primary colors. The use of the color wheel 64 simplifies the system by requiring only one two dimensional array 46 to be illuminated by each color, in turn, for one-third of the time duration of each frame. Of course, the reflective surfaces 44 are adjusted for the display of each primary color intensity at each pixel during each frame.

In another alternative embodiment of this invention, the horizontal scanning is accomplished by aligning the reflective surfaces 44 of the mirror array 32 and scanning the row of pixels on each reflective surface 44 vertically.

While the invention has been particularly shown and described in reference to the preferred embodiments thereof, it will be understood by those skilled in the art that changes in form and details may be made without departing from the scope of the invention.

We claim:

1. A television display apparatus comprising:
   a source for emitting a white light;
   means for splitting said white light into a plurality of primary light beams, each of said primary light beams being one of the primary colors;
   means for spreading each of said primary light beams into a bell-shaped beam;
   means for clipping the profile of each of said bell-shaped beams into a clipped beam;
   means for horizontally scanning each of said clipped beams simultaneously;
   means for collimating said scanned light into a collimated beam; and
   means for projecting said collimated beam onto a screen.

2. A television display apparatus in accordance with claim 1 wherein said white light is passed through a first collimation lens in order to collimate it.

3. A television display apparatus in accordance with claim 1 wherein said splitting means is a plurality of dichroic mirrors.

4. A television display apparatus in accordance with claim 1 wherein said splitting means is a diffraction grating.

5. A television display apparatus in accordance with claim 1 wherein said splitting means is a prism.

6. A television display apparatus in accordance with claim 1 wherein said splitting means is a rotating translucent wheel, said translucent wheel being divided into red, green and blue segments.

7. A television display apparatus in accordance with claim 6 wherein said rotating translucent wheel rotates at a rate of 60 cycles per second.

8. A television display apparatus in accordance with claim 6 wherein said rotating translucent wheel splits said white light into a plurality of primary light beams, each of said primary light beams being sequentially emitted from said rotating translucent wheel.

9. A television display apparatus in accordance with claim 1 wherein said spreading means is a mirror array.

10. A television display apparatus in accordance with claim 1 wherein said spreading means further comprises a means for altering the direction which the bell-shaped beams are reflected.

11. A television display apparatus in accordance with claim 9 wherein said mirror array is comprised of a plurality of reflective surfaces.

12. A television display apparatus in accordance with claim 9 wherein said spreading means further comprises a means for deforming each reflective surface of said mirror array in response to signals received by the electrical control circuitry.

13. A television display apparatus in accordance with claim 11 wherein each reflective surface of said mirror array is layered on both a base member and said deforming means.

14. A television display apparatus in accordance with claim 12 wherein each reflective surface of said mirror array is attached at one end to said base member and at the opposite end to said deforming means.

15. A television display apparatus in accordance with claim 12 wherein said reflective surface is only attached to said deforming means.

16. A television display apparatus in accordance with claim 11 wherein each reflective surface is attached at both ends to said deforming means.

17. A television display apparatus in accordance with claim 11 wherein said deforming means is a piezoelectric crystal which deforms horizontally when a voltage is applied.

18. A television display apparatus in accordance with claim 11 wherein said deforming means is a piezoelectric crystal which deforms vertically when a voltage is applied.

19. A television display apparatus in accordance with claim 11 wherein said deforming means is a plurality of piezoelectric crystals which deform when voltage is applied to them.

20. A television display apparatus in accordance with claim 19 wherein the voltage applied to at least one of said plurality of piezoelectric crystals is 180 degrees out of phase with the voltage applied to at least one of another of said plurality of piezoelectric crystals.

21. A television display apparatus in accordance with claim 17 wherein each of said reflective surfaces of said mirror array is mounted on a top surface of a bimorphic piezoelectric crystal layer, said bimorphic crystal layer having one layer which expands horizontally when a voltage is applied and one layer which contracts horizontally when a voltage is applied, thereby bending said mirror when a voltage is applied.

22. A television display apparatus in accordance with claim 17 wherein each of said reflective surfaces of said mirror array is cantilevered on said piezoelectric crystal.

23. A television display apparatus in accordance with claim 1 wherein said clipping means is a non-reflective surface with a plurality of apertures therein.

24. A television display apparatus in accordance with claim 17 wherein said plurality of apertures is a plurality of pinholes.

25. A television display apparatus in accordance with claim 17 wherein said plurality of apertures is a plurality of knife-edged apertures.

26. A television display apparatus in accordance with claim 17 wherein said clipping means further comprises a pair of sets of bar strips before and after the mirror arrays which allow the system to operate in a Schlieren mode.

27. A television display apparatus in accordance with claim 1 wherein said horizontal scanning means is a rotating polygonal mirror of which said plurality of clipped beams simultaneously reflect off of one side of said polygon.

28. A television display apparatus in accordance with claim 1 wherein said horizontal scanning means is a galvanometer mirror.

29. A television display apparatus in accordance with claim 1 wherein said horizontal scanning means is a rotating holographic plate.

30. A television display apparatus in accordance with claim 1 wherein said means for collimating said beams is a second collimation lens.

31. A television display apparatus in accordance with claim 1 wherein said means for projecting said beams is a projection lens.

32. A television display apparatus comprising:
a source for emitting white light;
means for splitting said white light into a plurality of primary light beams, each of said primary light beams being one of the primary colors;
means for spreading each of said primary light beams into a bell-shaped beam;
means for clipping the profile of each of said bell-shaped beams into a clipped beam;
means for collimating said clipped beam into a collimated beam; and
means for projecting said collimated beam onto a screen.

33. A television display apparatus in accordance with claim 32 wherein said spreading means is a two-dimensional mirror array.

34. A television display apparatus in accordance with claim 33 wherein said means for clipping is an array of apertures in a non-reflective surface.

35. A method for projecting an image onto a screen comprising the steps of:
splitting a white light beam into three primary beams, one of each primary beams being one of the primary colors;
spreading each of the primary beams into a bell-shaped beam;
passing said bell-shaped beams through apertures in a non-reflective surface, thereby modulating the intensity of said bell-shaped beams;
horizontally scanning said beams simultaneously;
collimating said scanned beams into a collimated beam; and
projecting said collimated beam onto a screen.

36. A television display apparatus comprising:
a source of optical energy to emit a light beam;
a plurality of mirrors arranged in an MxN mirror array, said array positioned to be illuminated by said light beam and to reflect said light beam as a plurality of reflected beams, each of said reflected light beams emanating from a respective one of said mirrors;
a non-reflective surface having a plurality of elongated slits therein, said slits being arranged so that each row of said reflected beams normally passes through a respective one of said slits, each of said mirrors being movable to direct a portion of said optical energy of said respective one of said reflected beams to an obfuscation adjacent said respective one of said slits thereby controlling intensity of each said reflected beams;
a screen illuminated by said reflected beams subsequent to passing through said slits to display an image.

37. An apparatus in accordance with claim 36 further comprising a projection lens operatively disposed intermediate said surface and said screen.

38. An apparatus in accordance with claim 36 further comprising a color wheel operatively disposed intermediate said source and said array, said color wheel sequentially passing each one of three primary colors during each frame of said image, said mirrors being adjusted for each of said primary colors.

39. A television display apparatus comprising:
a source of optical energy to emit a light beam;
a first non-reflective surface having a plurality of elongated first slits therein and first obfuscations adjacent each of said first slits, said first surface being positioned to be illuminated by said light beam;
a second non-reflective surface having a plurality of elongated seconds slits therein and second obfuscations adjacent each of said second slits;
a plurality of mirrors arranged in an MxN array, said array being positioned to reflect optical energy passing through said first slits so that said optical energy is directed toward said second array;
a first lens positioned to image each of said first slits to a respective one of said second obfuscations, each of said mirrors being movable to direct selectively a portion of said optical energy reflected therefrom through a respective one of said second slits thereby controlling intensity of optical energy reflected from each of said mirrors;
a screen disposed to be illuminated by optical energy passing through said second slits; and
a second lens to project said optical energy passing through said second slits to said screen.

40. An apparatus as set forth in claim 39 further comprising a color wheel sequentially passing each one of three primary colors during each frame of said image, said mirrors being adjusted for each of said primary colors.

* * * * *